Sept. 2, 1969  T. F. ROSE  3,465,090
ELECTRICAL JUNCTION BOXES FOR CHRISTMAS TREE HOLDERS
Filed Dec. 4, 1967
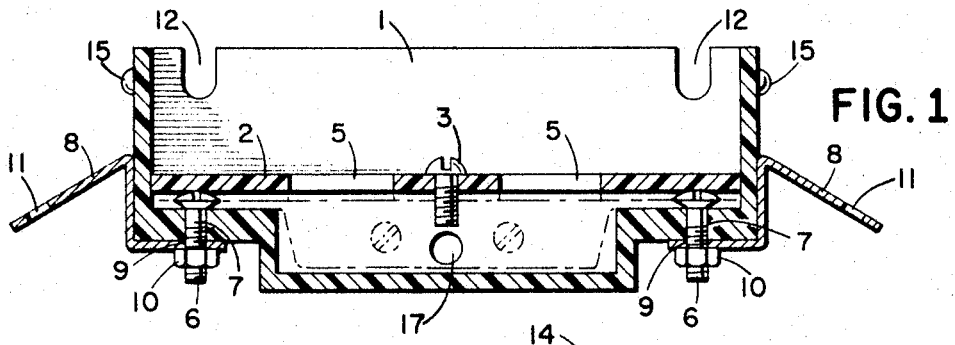
FIG. 1
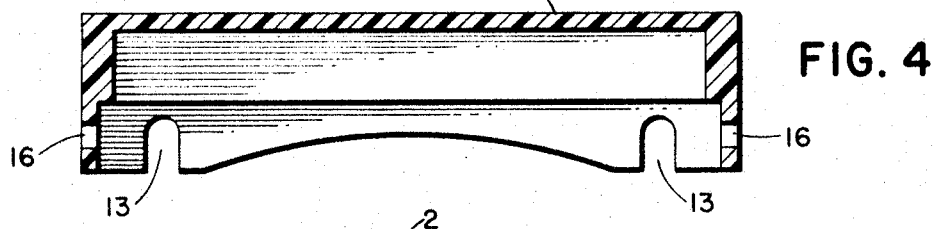
FIG. 4
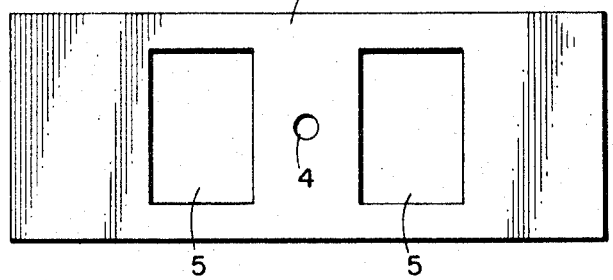
FIG. 2
FIG. 3
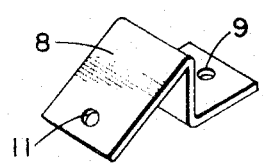
FIG. 5
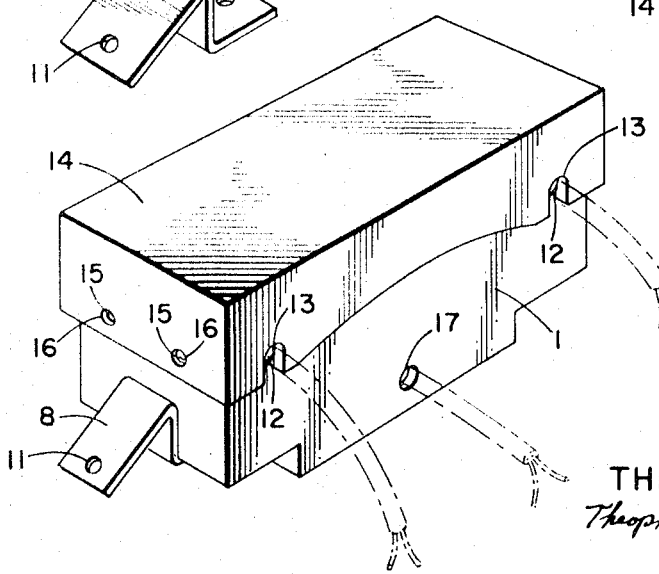
FIG. 6
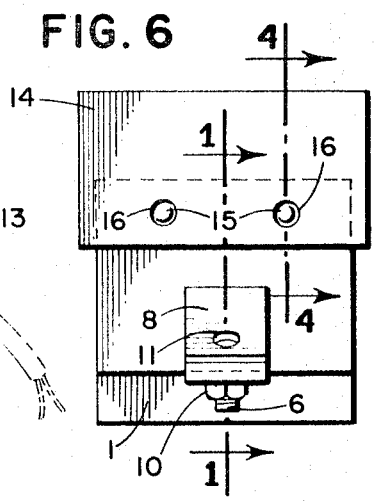
INVENTOR
THEOPHYLUS F. ROSE
*Theophylus Foster Rose*

# United States Patent Office 3,465,090
Patented Sept. 2, 1969

3,465,090
ELECTRICAL JUNCTION BOXES FOR
CHRISTMAS TREE HOLDERS
Theophylus Foster Rose, 1771 Berkeley Ave.,
Petersburg, Va. 23830
Filed Dec. 4, 1967, Ser. No. 696,668
Int. Cl. H01r 13/46; H01h 9/02
U.S. Cl. 174—58                                3 Claims

ABSTRACT OF THE DISCLOSURE

The distinct features of the invention consist of a rectangular box having semi-spherical lugs at each end, a receptacle cover plate with square holes which fits inside the box to provide additional safety against dirt and moisture, and a cover with circular holes at each end to match the lugs of the box for secure fastening and easy removal. The dielectric properties of molded phenolic makes the enclosure safe against short circuiting from outside sources. The resilience of the material facilitates forming of a seal between cover and box, insulating the current carrying parts against dirt and moisture.

---

This invention relates to improvements in electrical junction boxes. The invention differs from conventional junction boxes in that the requirements for such a junction box make it necessary to conceal the electrical connections which would ordinarily be exposed. Whereas, in a conventional electrical junction box, the circuit junctions are housed in the box mainly for the purpose of distributing the current to various points in the circuit, this invention is applicable to junction boxes which distribute the current, and also protect the fittings which ordinarily form an essential part of the circuit, but which are exposed as they are customarily used in the household. For these reasons, it is especially adaptable for use with a Christmas tree holder since water is used in the holder.

One object of the invention is to provide a safe electrical junction box for Christmas tree holders which will serve the need for an insulated enclosure for the current carrying parts of a double electrical receptacle.

A second object of the invention is to provide an electrical junction box for Christmas tree holders having a securely fastened yet easily removable cover so as to make the receptacle easily accessible for connecting the tree lamps or other electrified ornaments to a 115-volt alternating current household circuit.

A third object of the invention is to provide an electrical junction box for Christmas tree holders which can be sealed against the entry of dust and dirt, and against the entry of water from spillage or seepage when the cover of the box is in the closed position.

A fourth object of the invention is to provide an electrical junction box for Christmas tree holders which will make the setting up of a Christmas tree safer, and which will protect the tree holder electrical supply circuit from the hazards of short circuiting present in flush mounted receptacle installations.

A fifth object of the invention is to provide an electrical junction box for Christmas tree holders having a convenient and safe means for distributing 115-volt alternating electric current to the tree lamps or other ornaments or decorative devices, thereby making it unnecessary to plug the tree lamps or other decorations directly into a household wall receptacle.

The accompanying drawing illustrates the invention in which FIGURE 1 is a section view of the junction box with the cover removed taken along lines 1—1 of FIG. 6 looking in direction of the arrows and showing how a standard double electrical receptacle is housed in the box and fastened thereto; FIGURE 2, a top view of the receptacle cover plate showing how a plug can be fitted into either side of the receptacle through the openings in the cover plate; FIGURE 3, a perspective view of the bracket used to fasten the junction box to a conventional cone shaped or dome shaped base; FIGURE 4, a section view of the junction box cover taken along lines 4—4 of FIG. 6 showing how the seal is accomplished along two surfaces in two different directions between the cover and the box; FIGURE 5, a perspective view of the entire junction box with cover attached showing the relative positions of the supply and feeder wires entering and leaving the box; and FIGURE 6, an end view of the junction box with cover attached showing the location of the lugs and matching holes with respect to the open sides of the box and cover.

Junction box 1, is made of molded phenolic or a similar material having good dielectric properties. It is molded integral and in one piece. Receptacle cover plate 2, is made separately and is also made of molded phenolic or a similar material. It fits inside the junction box with a small amount of clearance, providing additional protection to the current carrying parts. Round head screw 3, passes through hole 4, of the receptacle cover plate to hold the plate securely to the receptacle. Square holes 5, in the receptacle cover plate allow the tree lamp or accessory plugs to be fitted into either side of the receptacle as required. A standard double receptacle is held securely in the position shown in the drawing (FIG. 1) by means of bolts 6, which pass through the metal supports at each end of the receptacle and through holes 7, of the junction box. Bolt 6, also passes through metal bracket 8, through hole 9, of the bracket and the entire assembly is held together by means of nut 10. Since both ends of the junction box are made identical, a single description should suffice. Hole 11, in the opposite end of bracket 8, allows for fastening each end of the junction box assembly to the underside of a conventional conical or dome shaped base.

Semi-circular slots 12, are molded in the top edge of one side of the junction box. Slots 12, match with semi-circular slots 13, which are molded in the lower edge of one side of cover 14 (FIG. 4). The cover is also made of molded phenolic or similar material. When the cover is snapped into position on the junction box, the slots 12, 13, form a circular opening at each end of the box through which the feeder lamp cord passes for connecting to the tree lamps or other decorative devices.

When placing cover 14, on junction box 1, lugs 15 (FIG. 1) are matched with holes 16, on one end of the cover (FIG. 4). Lugs 15, are made of the same material as the junction box proper, and are molded integral with the box. Lugs 15, are of a slightly smaller diameter than holes 16, and are semi-spherical in shape. They consequently project far enough into holes 16, of the cover to hold it securely to the box. Molded phenolic having high tensile and impact strength, the resilience of this material is advantageous because it can be deflected enough to slide over the lugs without exceeding the breaking strength of the material, and after sliding over the lugs, returns to its original shape to form the seal. It has been found also, that this hole and lug type catch or method of fastening, facilitates the forming of a seal further by allowing the air which would normally be entrapped, to escape through the holes and around the lugs when the cover is snapped into position. This is intended to make the fastening means more positive acting and prevent the cover from resting on a cushion of air. When the opposite end of cover 14, is forced downward the two lugs 15, on this end, match with the two corresponding holes 16, and the cover is snapped closed. When the cover is in this position, there are two surfaces of the cover in two directions making contact between the junction box and the cover to resist the flow of spilled water or seepage into the box. The supply cord passes through hole 17, into the junction box (FIG. 5). It is connected to the terminals of the receptacle (FIG. 1). Since holes 12, 13, and hole 17, are located on the down slope side of a conical or dome-shaped base, this affords further protection from the entry of water by spillage or seepage, the only openings between the inside of the junction box and the outside air being the small amount of clearance between the cords and the circular holes. The lower edge of cover 14, can be formed to any convenient radius as required to fit the contour of the base on the top side.

The extreme top of the cover on the outside is flat and serves as a space for attaching a gummed label with printed instructions for the user.

Having described this invention, what is claimed is:

1. An electrical junction box for Christmas tree holders comprising in combination, a box having space for receiving and housing a double electrical receptacle and the terminal connections thereto; a bolthole on each end of the box for fastening the receptacle to the box and the box to a bracket; two semi-spherical projecting lugs on each end of the box; a receptacle cover plate with two rectangular holes for receiving the plug and to retard the entry of dirt and moisture when the receptacle is exposed for installing the plug; a cover with two circular holes on each end to match and receive the lugs on the box; said cover extending below the upper edge of the box and along the outside of the box; the inside vertical faces of said cover having a continuous flat projection, said cover and junction box acting in conjunction to form an insulated enclosure for protecting the current carrying parts of a double electrical household type receptacle.

2. An electrical junction box for Christmas tree holders comprising in combination, a box having space for receiving and housing a standard double electrical receptacle; a bolt hole on each end of the box for fastening the receptacle to the box and the box to brackets; two semi-spherical projecting lugs on each end of the box; a receptacle cover plate with two rectangular holes for receiving the plugs and to retard the entry of dirt and moisture when the receptacle is exposed for installing the plugs; and a junction box cover having two circular holes on each end to match and receive the lugs on the box, said lugs and holes serving to securely fasten the cover to the junction box yet making the cover easily removable from the box when installing a plug or servicing.

3. An electrical junction box for Christmas tree holders comprising in combination, a box having space for receiving and housing a double receptacle; a bolt hole on each end of the box for fastening the receptacle to the box and the box to brackets; a receptacle cover plate with two rectangular holes for receiving the plugs and to retard the entry of dirt and moisture when the receptacle is exposed for installing the plugs; two semi-spherical projecting lugs on each end of the box; and, a junction box cover having two circular holes on each end for matching and receiving the lugs on the box; said cover having dual sealing means with respect to the box, for the purpose of preventing the entry of dirt, and the entry of water from spillage or seepage.

References Cited

UNITED STATES PATENTS 2,774,472   12/1956   Badalich _____ 220—60 X
2,916,733   12/1959   Hirsch.

LEWIS H. MYERS, Primary Examiner

D. A. TONE, Assistant Examiner

U.S. Cl. X.R.

220—60